United States Patent
Aoki et al.

(10) Patent No.: US 11,815,695 B2
(45) Date of Patent: Nov. 14, 2023

(54) IMAGE DISPLAY SYSTEM

(71) Applicant: TOYOTA JIDOSHA KABUSHIKI KAISHA, Aichi-ken (JP)

(72) Inventors: Takayuki Aoki, Toyota (JP); Ryusuke Ohta, Toyota (JP); Tomohiro Inada, Kariya (JP); Hitoshi Muraki, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/991,245

(22) Filed: Nov. 21, 2022

(65) Prior Publication Data
US 2023/0161169 A1    May 25, 2023

(30) Foreign Application Priority Data
Nov. 22, 2021    (JP) .................... 2021-189237

(51) Int. Cl.
*G02B 27/01* (2006.01)
*H04W 4/02* (2018.01)
*B60R 11/02* (2006.01)
*G06T 7/579* (2017.01)

(52) U.S. Cl.
CPC ...... *G02B 27/0179* (2013.01); *B60R 11/0241* (2013.01); *G02B 27/0101* (2013.01); *G02B 27/017* (2013.01); *G06T 7/579* (2017.01); *H04W 4/025* (2013.01); *G02B 2027/014* (2013.01); *G02B 2027/0138* (2013.01);
(Continued)

(58) Field of Classification Search
CPC .............. G02B 27/0101; G02B 27/017; G02B 27/0176; G02B 2027/0134; G02B 2027/014; G02B 2027/0198
See application file for complete search history.

(56) References Cited

U.S. PATENT DOCUMENTS 3,816,005 A * 6/1974 Kirschner .......... G02B 27/0149
                                                            2/6.2
2015/0309311 A1* 10/2015 Cho .................... G02B 27/017
                                                            345/8
2019/0059791 A1* 2/2019 Noro .................... A61B 5/6893
(Continued)

FOREIGN PATENT DOCUMENTS

JP          201777296 A     4/2017
JP         2017129406 A     7/2017
JP          202164906 A     4/2021

*Primary Examiner* — Nitin Patel
*Assistant Examiner* — Cory A Almeida
(74) *Attorney, Agent, or Firm* — HAUPTMAN HAM, LLP (57) ABSTRACT

An image display system includes a wearable device including a display configured to display an image in a field of vision of a user and a first sensor configured to detect an absolute movement of the display, and a mobile terminal including a second sensor configured to detect an absolute movement of the vehicle. The image display system further includes an image controller including a computer installed in the mobile terminal to display a subject image on the display in an AR display mode. The image controller is configured to determine a display position of the subject image on the display based at least on the absolute movement of the display detected by the first sensor and the absolute movement of the vehicle detected by the second sensor.

6 Claims, 7 Drawing Sheets

(52) U.S. Cl.
CPC .............. *G02B 2027/0178* (2013.01); *G02B 2027/0183* (2013.01)

(56) References Cited

U.S. PATENT DOCUMENTS

2020/0154131 A1\* 5/2020 Iyer ..................... H04N 5/33
2021/0118192 A1   4/2021 Sato et al.

\* cited by examiner

IMAGE DISPLAY SYSTEM

CROSS REFERENCE TO RELATED APPLICATION

This application claims priority to Japanese Patent Application No. 2021-189237 filed on Nov. 22, 2021, which is incorporated herein by reference in its entirety including the specification, claims, drawings, and abstract.

TECHNICAL FIELD

The present description discloses an image display system that displays a subject image representing a predetermined subject to be superimposed on a field of vision of a user or an occupant of a mobile body using an augmented reality (hereinafter abbreviated as "AR") technique.

BACKGROUND

A technique for displaying an image that augments reality on a field of vision of a user or an occupant has been proposed. Patent Document 1, for example, discloses a technique of displaying, on smart glasses or a glasses-type display worn by a user or a driver of a vehicle, an image of a leading vehicle that the user's vehicle is following. In Patent Document 1, the leading vehicle expressed by the image moves to guide the driver's vehicle to a destination. This technique enables the driver to travel to the destination by operating the vehicle so as to follow the leading vehicle.

In the AR technique, it is necessary to estimate the position and attitude (hereinafter referred to as the "location") of a display in a real space and determine, based on the obtained location of the display, a display position of a subject image representing a subject in the display. Known techniques for estimating the location of the display or localizing the display include visual Simultaneous Localization and Mapping (SLAM). The visual SLAM is a technique for estimating, based on a SLAM image captured by a camera, environmental three-dimensional information and the position and attitude of the camera. This technique also enables estimation of behavior of the display from a change of the SLAM image.

CITATION LIST

Patent Literature

[Patent Document 1] JP 2017-129406 A

SUMMARY

When the user is in the mobile body, it is difficult to judge whether a change of the SLAM image results from movement of the user's head (and therefore movement of the display) or movement of the mobile body. This may reduce the accuracy of estimation of the location of the display, failing to display the subject image at an appropriate position.

While it may be possible to receive, from the mobile body, information regarding its movements and estimate the location of the display based on the information, this configuration requires that the mobile body should have a communication function with a wearable device including the display. This limits mobile bodies to those that can utilize the AR technique described above. Further, a mobile body configured to provide information regarding movements of the mobile body uses some amount of calculation and communication resources for calculation and communication to collect the information, which may adversely affect the calculation and communication for moving control of the mobile body.

An aspect of the disclosure is therefore aimed toward an image display system that enables more appropriate display of a subject image without increasing the communication load or the like of a mobile body.

In accordance with an aspect of the disclosure, an image display system includes a wearable device to be attached to the head of a user that is an occupant of a mobile body and including a display configured to display an image on a field of vision of the user and a first sensor configured to detect an absolute movement of the display with respect to an external stationary object, a mobile terminal including a second sensor configure to detect an absolute movement of the mobile body, and an image controller including a computer installed in at least one of the wearable device or the mobile terminal and configured to enable the display to display a subject image representing an object in such a manner that the object that is represented by the subject image is actually present. The image controller is configured to determine a display position of the subject image on the display based at least on the absolute movement of the display detected by the first sensor and the absolute movement of the mobile body detected by the second sensor.

This configuration enables separate acquisition of the absolute movement of the display and t of the mobile body, to thereby enable more appropriate display of the subject image. Further, detection of the absolute movement of the mobile body by the mobile terminal prevents an increase in the load of communication required of, for example, the mobile body.

In this configuration, the image controller may be configured to estimate a relative movement of the display with respect to the mobile body based on a difference between the absolute movement of the display detected by the first sensor and the absolute movement of the mobile body detected by the second sensor and determine the display position of the subject image associated with the mobile body on the display based at least on the relative movement of the display.

This configuration enables more appropriate display of the subject image associated with the mobile body.

The wearable device may further include a SLAM camera configured to capture an image of surroundings of the wearable device as a SLAM image, and the image controller may be configured to determine the display position of the subject image on the display, based on a movement of the display that is estimated from the SLAM image and detection results of the first sensor and the second sensor.

Determining the display position in consideration of the SLAM image in addition to the detection results from the first sensor and the second sensor enables more appropriate display of the subject image.

Each of the first sensor and the second sensor may include at least one of an accelerometer or a gyroscope sensor.

The use of at least one of the accelerometer or the gyroscope sensor enables more accurate detection of the absolute movements of the display and the mobile body.

The second sensor may be configured to detect the absolute movement with reference to mutually orthogonal three detection reference axes, and the image display system may further include an on-vehicle holder fixed to the mobile body and configured to hold the mobile terminal such that the detection reference axes of the second sensor are parallel to a longitudinal axis, a vertical axis, and a lateral axis of the mobile body, respectively.

The use of the on-vehicle holder reduces a moving amount to be input to the two detection reference axes orthogonal to the longitudinal direction of the mobile body, of the three detection reference axes, thereby enabling reduction in the volume of calculation required to obtain the absolute movement.

The mobile terminal may be fixed to a surface of a rigid body, within a vehicle cabin, secured to the mobile body.

This configuration can reduce the movement of the second sensor with respect to the mobile body, to thereby enable more accurate detection of absolute movement of the mobile body.

The image controller may be configured to exclude a detection value of the second sensor which is equal to or smaller than a predetermined reference value from calculation of the display position.

This configuration can remove effects of slight oscillation of the mobile terminal on the mobile body, to thereby enable more appropriate display of the subject image.

The technique disclosed in the disclosure enables more appropriate display of the subject image without increasing the load of calculation on the mobile body.

BRIEF DESCRIPTION OF DRAWINGS

Embodiments of the present disclosure will be described based on the following figures, wherein.

DESCRIPTION OF EMBODIMENTS

Figure 1:
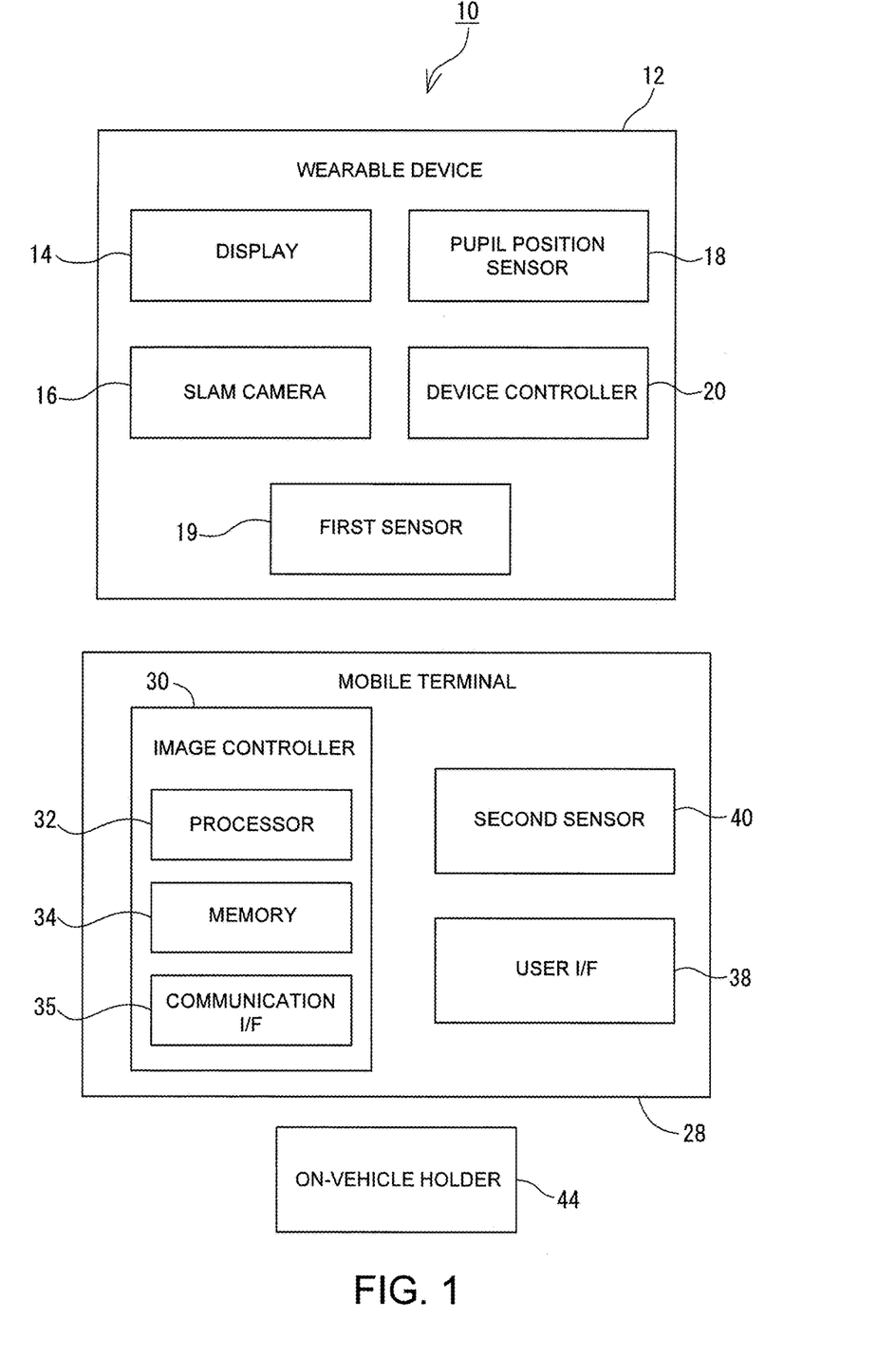
FIG. 1 is a block diagram illustrating a configuration of an image display system.

The configuration of an image display system 10 will be described with reference to the drawings. While in the following specific embodiments are described for the ease of understanding, they are only examples and may be modified as appropriate. FIG. 1 is a block diagram illustrating the configuration of the image display system 10. The image display system 10 includes a wearable device 12 and a mobile terminal 28.

The wearable device 12 is a device an occupant of the vehicle, such as a driver, wears on their head, and may be an eyeglasses or goggles shaped device. The wearable device 12 includes a display 14, a SLAM camera 16, a pupil position sensor 18, a first sensor 19, and a device controller 20.

Figure 2:
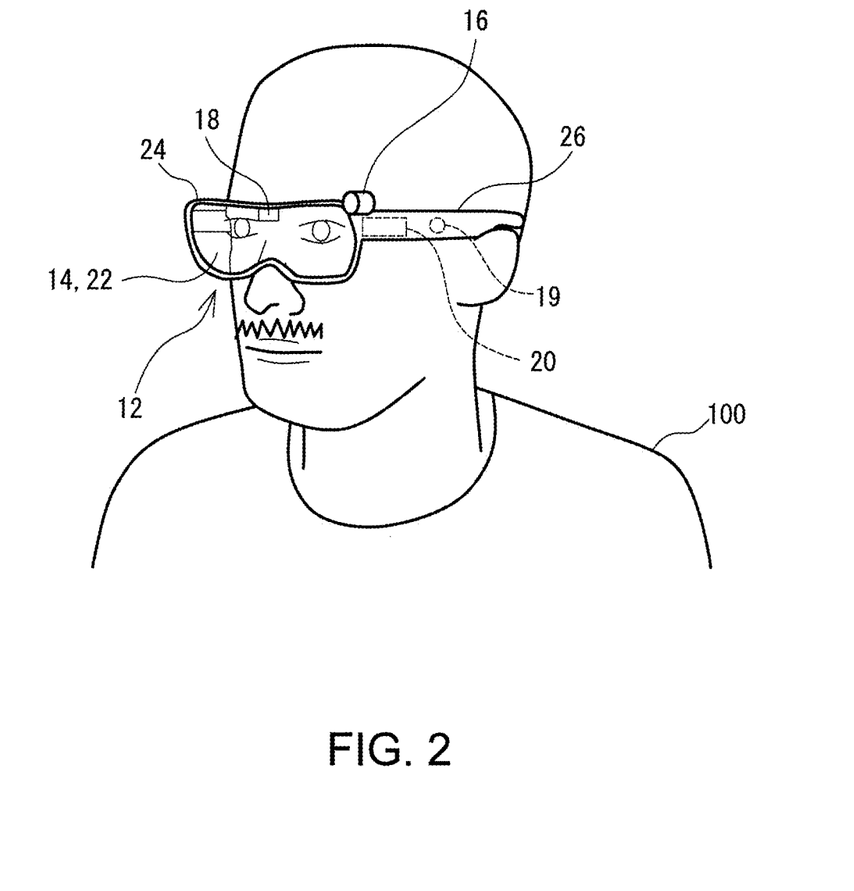
FIG. 2 illustrates a user wearing a wearable device.

The wearable device 12 will be described in detail with reference to FIG. 2. FIG. 2 illustrates a user 100 that is an occupant of the vehicle wearing the wearable device 12. The wearable device 12 is in the form of a pair of eyeglasses and is referred to as smart glasses or AR glasses. The wearable device 12 includes temples 26 that are linear frames to be put over respective ears and a rim 24 that is a frame surrounding the eyes and that is to be put across the nose.

The display 14 displays an image on the field of vision of the user 100 wearing the wearable device 12. In this example, the display 14 is an organic EL display or a liquid crystal display having a display area 22 disposed within the rim 24, and displays an image in part of or over the entire region of the display area 22. The display area 22 having high transparency allows the user 100 or the occupant to visually recognize a front scenery through the display area 22 when no image is displayed on the display area 22. The display area 22, when displaying an image in only part of the display area 22, allows the user 100 to see both the front scenery in the field of view and the displayed image simultaneously. At this time, the image may be opaque or translucent. In the following description, an image displayed on the display 14 is referred to as a "subject image" for discrimination from other images. Also, an object which is virtually represented by the subject image is referred to as a "subject".

The SLAM camera 16 is fixed to the display 14 to image the surroundings of the display 14. The SLAM camera 16 is secured, for example, to the vicinity of a front end of the temple 26 so as to face forward, and captures an image within a range similar to that of the field of vision of the user 100. In the following description, an image captured by the SLAM camera 16 will be referred to as a "SLAM image". An image controller 30, which will be described below, extracts a feature point from a scenery in the SLAM image to specify the position and attitude of the display 14 in a real space, as will be described below.

The pupil position sensor 18 detects the positions of pupils in right and left eyes of the user 100, and is fixed to the vicinity of the center of the rim 24, for example. The pupil position sensor 18 may be formed of a camera, including an infrared camera, for example.

The first sensor 19 detects movement of the display 14, and further movement of an eyepoint of the user 100, with respect to the earth (hereinafter referred to as "absolute movement"). The first sensor 19 includes an accelerometer and a gyroscope sensor, for example. The accelerometer detects the acceleration along mutually orthogonal three axes (hereinafter referred to "detection reference axes") as a voltage value. The gyroscope sensor detects the angular velocity about mutually orthogonal three detection reference axes as a voltage value. The detected values from the first sensor 19 are transmitted, via the device controller 20, to the image controller 30. The first sensor 19 is fixed to the display 14, and is contained in the temple 26, for example.

The device controller 20 controls operation of the wearable device 12 in response to an instruction from the image controller 30. The device controller 20 may be a computer having a processor and a memory, for example. The device controller 20 continuously transmits the images captured by the SLAM camera 16 and the pupil position sensor 18 and the detected values of the first sensor 19 to the image controller 30. The device controller 20 further displays the subject image on the display 14 in accordance with an instruction from the image controller 30.

Referring again to FIG. 1, the mobile terminal 28 will be described. The mobile terminal 28 is a mobile information terminal, such as a smartphone, a tablet terminal, a notebook computer, or a mobile game machine. The mobile terminal 28 is carried with the user 100 into the vehicle cabin.

Figure 3:
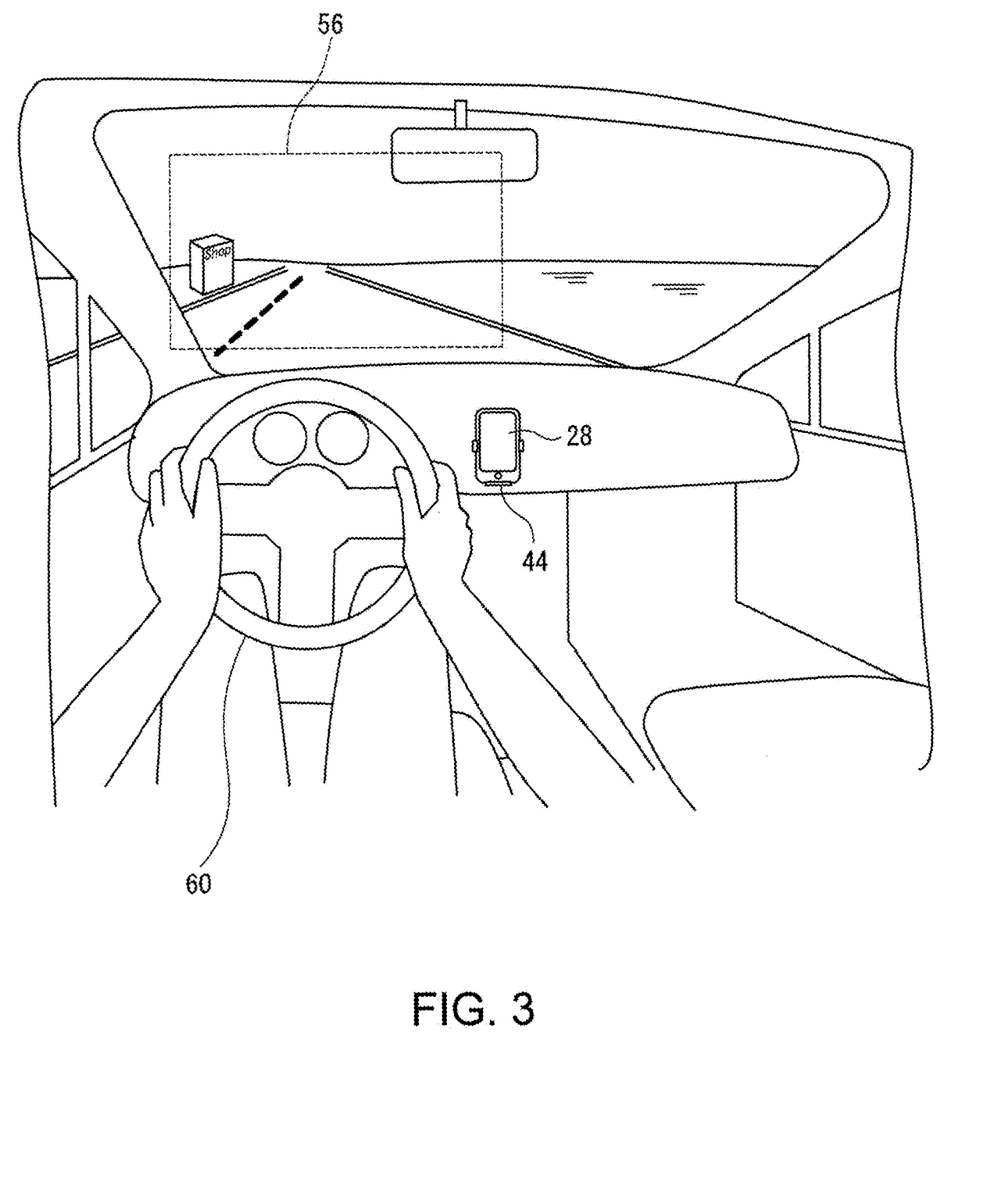
FIG. 3 schematically illustrates a field of view of a driver or a user.

The vehicle includes, within the vehicle cabin, an on-vehicle holder 44 to which the mobile terminal 28 can be temporarily attached. As illustrated in FIG. 3, the mobile terminal 28 brought into the vehicle cabin is fixed to the vehicle via the on-vehicle holder 44. In other words, the mobile terminal 28 is held to move with the vehicle.

The mobile terminal 28 includes the image controller 30, a user interface (hereinafter referred to as a "user I/F") 38, and a second sensor 40. The user I/F 38 includes an input device that receives an operation instruction from the user 100, and an output device that provides information to the user 100. The input device includes at least one of a keyboard, a switch, a touch screen, or a microphone, and the output device includes at least one of a display, a lamp, or a speaker.

The second sensor 40 detects the movement of the mobile terminal 28 and also of the vehicle with respect to the earth, that is, the absolute movement. The second sensor 40 includes, for example, an accelerometer that detects acceleration along the detection reference axes, and a gyroscope sensor that detects the angular velocity about the detection reference axes. The detected values from the second sensor 40 are transmitted to the image controller 30.

The image controller 30 generates data of a subject image to be displayed on the display 14. The image controller 30 is physically a computer including a processor 32, a memory 34, and a communication I/F 35. The computer includes a microcontroller composed of a computer system integrated into a single integrated circuit. The processor 32 refers to a processor in a broad sense, and includes a general-purpose processor, such as a Central Processing Unit (CPU), and a special-purpose processor, such as a Graphics Processing Unit (GPU), an Application Specific Integrated Circuit (ASIC), a Field Programmable Gate Array (FPGA), or a programmable logic device.

The memory 34 refers to a device that stores digital data to be processed by the computer. The memory 34 includes at least one of a main memory connected with the processor 32 via a memory bus or a secondary memory device that accesses the processor 32 via an input/output channel. The memory 34 may include at least one of a semiconductor memory, such as RAM, ROM or solid state drive, for example, or a magnetic dick, such as a hard disk drive.

The communication I/F 35 transmits and receives data, wirelessly or through a wired connection, to and from other electronic devices, or specifically the wearable device 12. For example, the communication I/F 35 may transmit and receive data to and from the wearable device 12 through short-distance wireless communication such as Bluetooth (registered mark), Wi-Fi (registered mark), or infrared communication.

The image controller 30 may include a plurality of computers mechanically spaced from each other, rather than being a single computer. The processing of the image controller 30 which will be described below may be partially or entirely implemented by a computer installed in the wearable device 12. As such, the image controller 30 may be disposed in the wearable device 12 rather than in the mobile terminal 28.

Figure 4:
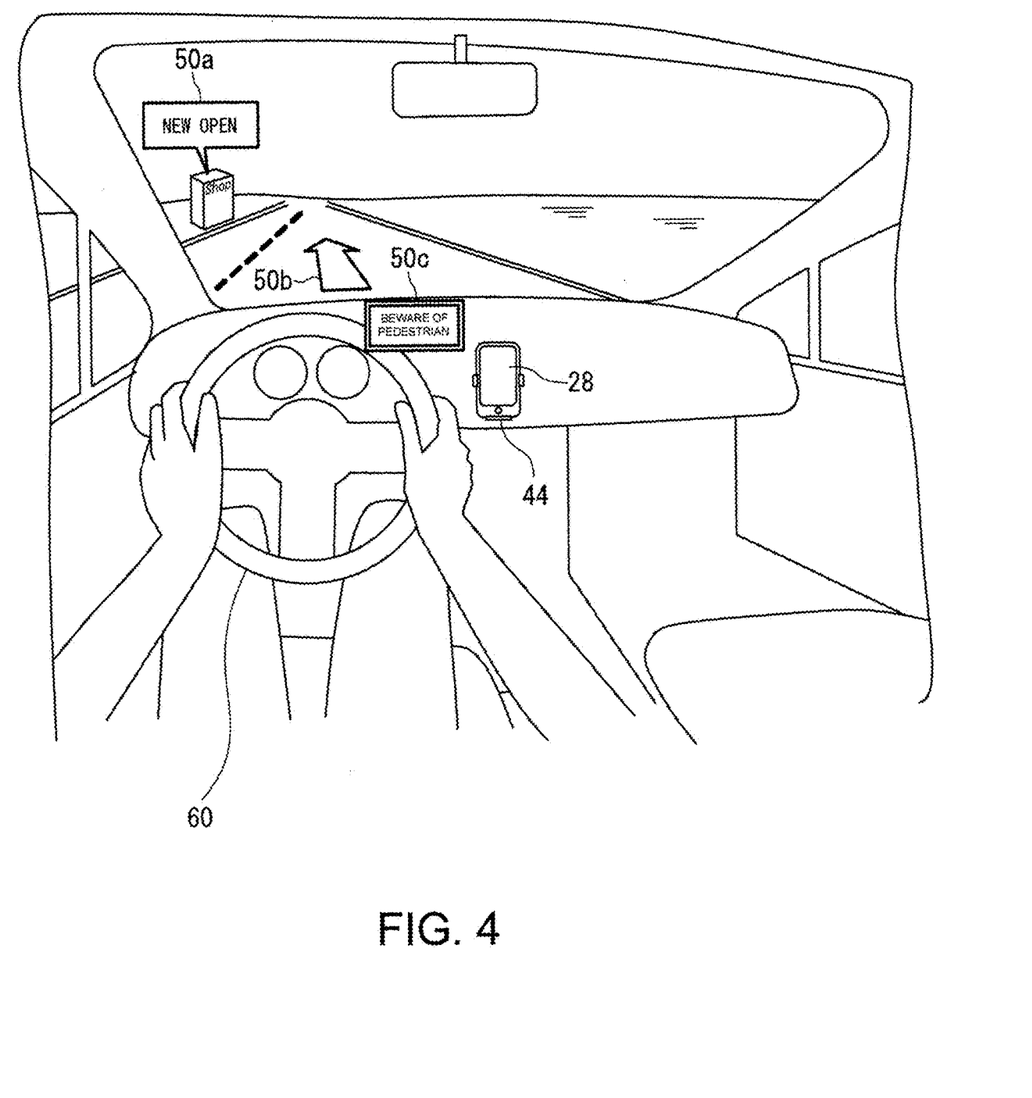
FIG. 4 schematically illustrates the field of view of a user with the subject image being displayed.

The image controller 30 causes the display 14 to display subject images 50a, 50b, and 50c, as if virtual objects represented by the respective subject images 50a, 50b, and 50c, or subjects, actually exist in the real space, as illustrated in FIG. 4. For example, the image controller 30 virtually places the subject in the real space, calculates the view of the subject, which is assumed to be actually present, from the user 100, generates a subject image in accordance with the view, and displays the subject image on the display area 22 of the display 14. Hereinafter, a display mode in which a subject is displayed as if the subject actually exists will be referred to as an "AR display" mode.

An example sample display of the subject image 50 in the present embodiment will be described. FIG. 4 schematically illustrates the field of vision of the user 100 (or a driver in this example) with the subject images 50a, 50b, and 50c being displayed. In the example illustrated in FIG. 4, the subject image 50a indicating information on a store outside the vehicle (information indicating a grand opening in the illustrated example), the subject image 50b indicating the travelling direction of the vehicle, and the subject image 50c indicating a message to attract the driver's attention, are displayed in the AR display mode. These subject images 50a, 50b, and 50c are displayed on the display 14 at positions and in sizes that are similar to the positions and sizes of the subjects represented by the respective images existing in the real world. The subject image 50a, for example, is displayed in the display area 22 at the position and in the size of a text object represented by the subject image 50a existing on the actual store outside the vehicle, assuming that the text object actually exists in the real world. Therefore, the position and the size of the subject image 50a within the display area 22 changes with the change of the relative positional relationship between the eye point of the user 100 and the store caused by travelling of the vehicle and the movement of the body of the user 100.

The subject image 50b is displayed in the display area 22 at the position and in the size similar to those of an arrow-shape object represented by the subject image 50b assuming that the object actually resides on the road surface in front of the vehicle that actually exists. The subject image 50c is displayed in the display area 22 at the position and in the size similar to those of a text object represented by the subject image 50c assuming that the object actually resides on the upper right portion of the steering wheel 60 in the real world. Thus, the display positions and the sizes of the subject images 50b and 50c within the display area 22 change with the movement of the eye point of the user 100 relative to the vehicle.

As described above, the AR display mode enables display of the subject image 50 in consideration of locations of actual objects, thereby reliably preventing the subject image 50 from obstructing the driving operation. The AR display mode further enables the subject image 50 to be displayed at a position correlated to the actual object, such as a store, thus effectively directing attention of the user 100 toward the object.

To perform the AR display, it is necessary to calculate the view of the subject from the user 100 assuming that the subject is actually present, as described above. The view is determined based on a virtual disposing position of the subject, the position and attitude of the wearable device 12 in the real space, and the positions of the pupils with respect to the display 14.

The virtual disposition of the subject is determined by the image controller 30 based on the information content to be provided to the user 100. The positions of the pupils with respect to the display 14 are detected by the pupil position sensor 18, as described above.

The position and attitude of the wearable device 12 in the real space, or the location of the wearable device 12, can be estimated by repeating execution of visual SLAM in a predetermined sampling time. The visual SLAM refers to a technique of estimating three-dimensional information of the real space and the location of the display 14 from the SLAM image 52 (see FIG. 5) captured by the SLAM camera 16. The location of the wearable device 12 can be expressed, for example, with coordinate values of three orthogonal axes or x, y, and z coordinate values, and a rotation amount about the three orthogonal axes, or roll, yaw, and pitch. The image controller 30 extracts feature points from an actual scenery in the SLAM image 52, and performs space recognition and localization based on the positions of the feature points in the SLAM image 52 and the distance between the feature points, for example.

Some subject images are associated with the vehicle. For example, the positions of the subjects represented by the subject images 50b and 50c in FIG. 4, respectively, are determined with reference to the vehicle, and therefore the subject images 50b and 50c are determined to be associated with the vehicle. To determine the display positions of these subject images 50b and 50c accurately, it is required that the location of the display 14 with respect to the vehicle should be accurately estimated. However, it is difficult to accurately determine the location of the display 14 with respect to the vehicle only based on the SLAM image 52 described above.

More specifically, the movement of the display 14 with respect to an external stationary object appears as a change in the scenery in the SLAM image 52. It is therefore possible to specify the movement of the display 14 with respect to the external stationary object by specifying a change in the scenery in the SLAM image 52, or a change in the feature points. When the user 100 is on the vehicle, however, it is difficult to determine whether such a change in the scenery is caused by the movement of the head of the user 100 or by the movement of the vehicle.

Figure 5:
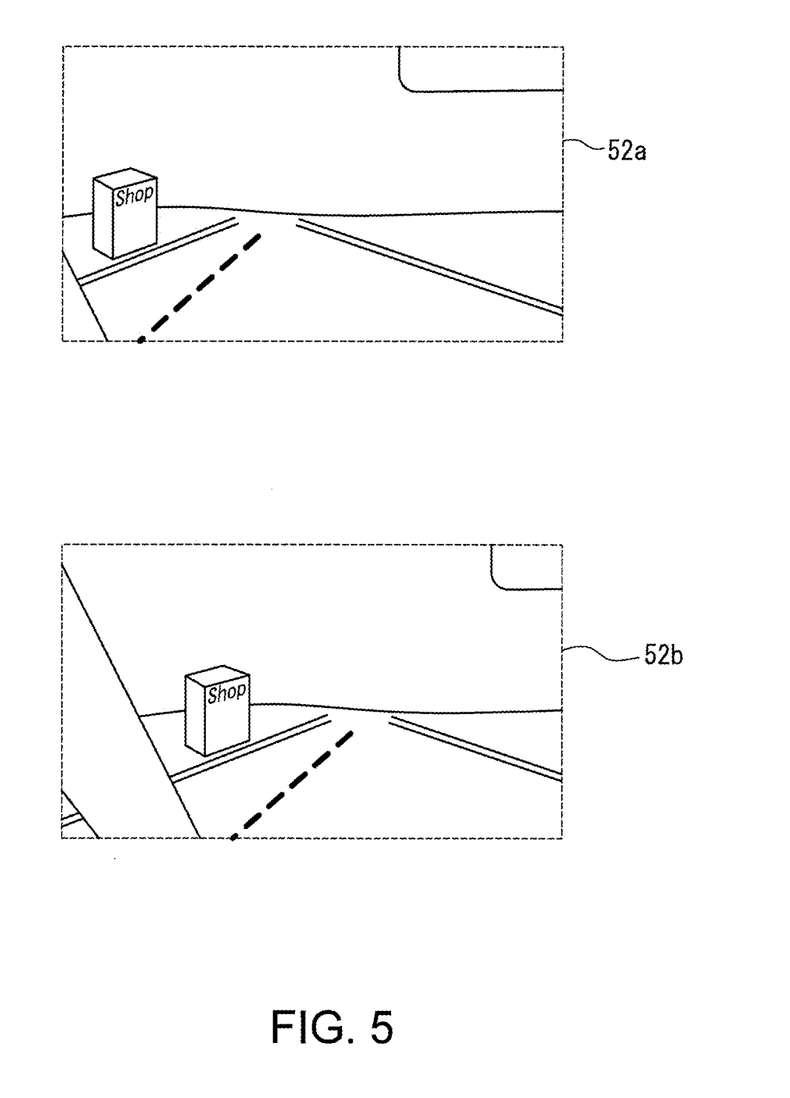
FIG. 5 illustrates an example SLAM image.

Assuming that an imaging area 56 of the SLAM camera 16 at a certain sampling timing corresponds to a rectangular area indicated by dashed line in FIG. 3, for example, a SLAM image 52a shown in the upper portion of FIG. 5 can be captured. It is further assumed that a SLAM image 52b shown in the lower portion of FIG. 5 is captured at a subsequent different sampling timing. Comparison between these two SLAM images 52a and 52b shows a change in the scenery, which leads to an assumption that at least one of the user's head or the vehicle has moved between the two sampling timings. It is, however, difficult to specify how each of the head and the vehicle has moved. As the two SLAM images 52a and 52b show part of the vehicle cabin, which is part of a room mirror in the illustrated example, it is possible to extract the feature points of the part of the vehicle cabin to thereby estimate the movement of the head with respect to the vehicle cabin. In this case, however, a larger number of feature points of the vehicle cabin are not shown in the SLAM images 52a and 52b, which results in failure to accurately estimate the movement of the head with respect to the vehicle cabin. Also, the SLAM image 52 showing a large number of feature points of the vehicle cabin may often similarly fail to estimate the movement of the head (and further, the display 14) with respect to the vehicle cabin at high precision, only based on the SLAM image 52 that is a two-dimensional image.

In this embodiment, the first sensor 19 disposed in the wearable device 12 and the second sensor 40 disposed in the mobile terminal 28 are used to respectively detect the movement, the absolute movement, of the display 14 with respect to the external stationary object and the movement, the absolute movement, of the vehicle with respect to the external stationary object individually, and these absolute movements are then used for localization and space recognition of the display 14.

Specifically, the image controller 30 acquires the absolute movement of the display 14 based on the detection result of the first sensor 19, and acquires the absolute movement of the vehicle based on the detection result of the second sensor 40, and calculates a relative movement of the display 14 with respect to the vehicle and further a relative movement between the vehicle and the display 14, based on a difference between the two absolute movements. More specifically, the image controller 30 may calculate a difference between the accelerations detected by the first sensor 19 and the second sensor 40, respectively, determine the moving speed of the display 14 with respect to the vehicle by applying time integration to the acceleration difference that is determined, and determine a displacement of the display 14 with respect to the vehicle by applying second-order integration to the acceleration difference.

Based on the relative movement of the display 14 that is acquired, the image controller 30 may correct the result of localization obtained through visual SLAM. This configuration increases the accuracy of estimation of the location or localization of the display 14, to thereby enable display of the subject images 50b and 50c at appropriate positions.

Figure 6:
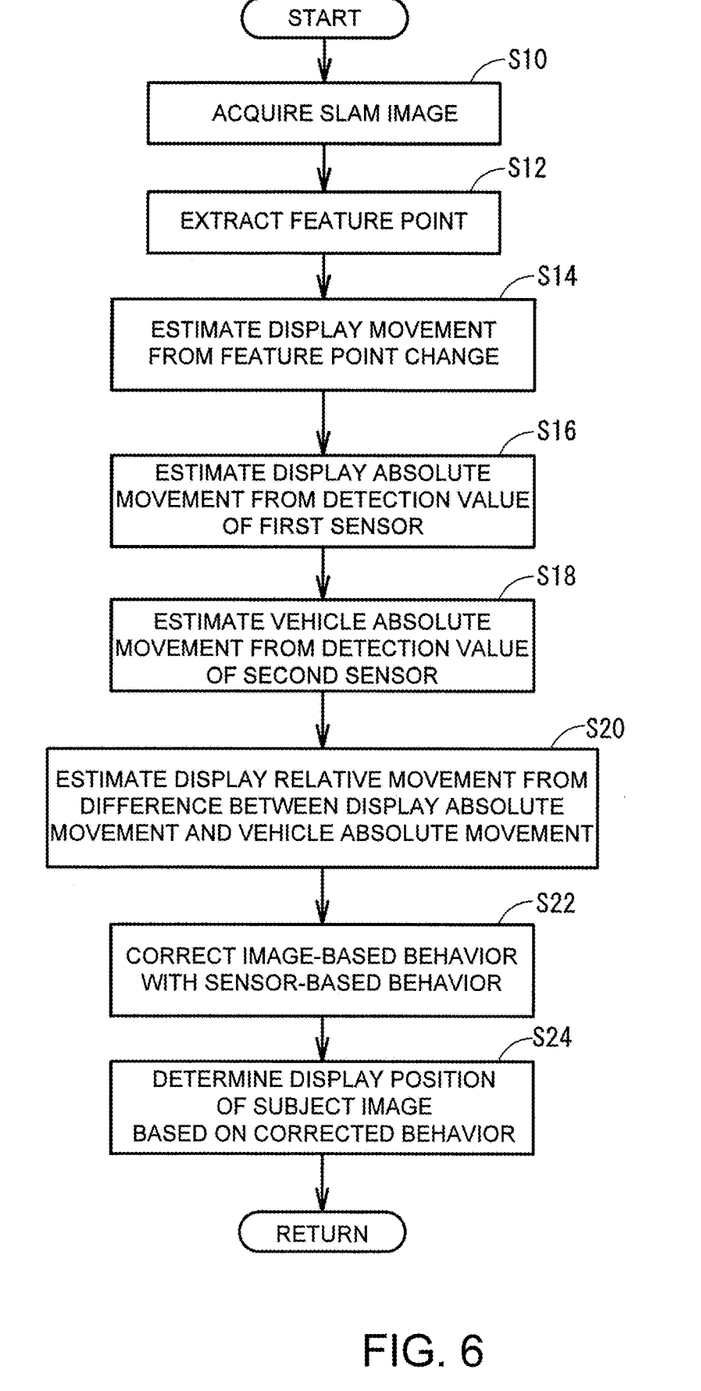
FIG. 6 is a flowchart illustrating a flow of calculation of a display position of the subject image.

FIG. 6 is a flowchart illustrating a flow of calculation of the display positions of the subject images 50b and 50c. As illustrated in FIG. 6, the image controller 30 acquires the SLAM image 52 (S10), and extracts feature points from a scenery in the SLAM image 52 (S12). The image controller 30 then estimates the movement of the display 14 based on a change of the extracted feature points (S14). Specifically, the image controller 30 estimates the movement of the display 14 with respect to the external space based on a change of the feature point outside the vehicle and estimates the movement of the display 14 with respect to the vehicle based on a change of the feature point within the vehicle. In the following description, the movement of the display 14 estimated from the SLAM image 52 will be referred to as an "image-based behavior".

The image controller 30 further estimates the absolute movement of the display 14 based on a detection value of the first sensor 19 (S16), and estimates the absolute movement of the vehicle based on a detection value of the second sensor 40 (S18). The image controller 30 then estimates the relative movement of the display 14 with respect to the vehicle based on the absolute movement of the vehicle and the absolute movement of the display 14 (S20). In the following description, the relative movement of the display 14 estimated from the detection values of the first sensor 19 and the second sensor 40 will be referred to as a sensor-based behavior.

After acquiring both the image-based behavior and the sensor-based behavior, the image controller 30 corrects the image-based behavior based on the sensor-based behavior, to estimate the accurate movement of the display 14 with respect to the vehicle (S22). The image controller 30, based on the estimation result, determines the display positions of the subject images 50b and 50c (S24). Similar procedure will be repeated in a predetermined sampling cycle.

As described above, modifying the image-based behavior in consideration of the sensor-based behavior increases accuracy of localization of the display 14 to enable more appropriate display of the subject images 50b and 50c. In the present embodiment, the movement of the vehicle is detected by the second sensor 40 disposed in the mobile terminal 28, and the image controller 30 installed in the mobile terminal 28 executes image processing. As such, the present embodiment eliminates the need for communication between the wearable device 12 and the vehicle. This configuration enables achieving AR display of the subject image 50 at appropriate position on a vehicle that is not equipped with a function of communicating with the wearable device 12. A vehicle capable of communication with the wearable device 12 may also suffer from deterioration of travelling control quality due to a reduction of operation and communication resources available for vehicle travelling control operations when providing information on the absolute movement of the vehicle, from the vehicle to the wearable device 12. In the present embodiment, execution of the operation necessary for AR display by the mobile terminal 28 and the wearable device 12 does not adversely affect the operation and communication regarding the vehicle travelling control.

In some embodiments, the vehicle may include a function to communicate with the wearable device 12 to enable the computer and the sensor mounted on the vehicle to execute processing similar to that executed by the mobile terminal 28 when the mobile terminal 28 is not in the vehicle. This configuration allows the user 100 to utilize the AR function even when the user 100 fails to bring the mobile terminal 28 in the vehicle. In this configuration, the vehicle may be further configured to automatically interrupt communication with the wearable device 12 when the mobile terminal 28 is in the vehicle, thereby reducing communication load of the vehicle.

While in the example illustrated in FIG. 6, the image-based behavior is calculated in the same cycle as the sensor-based behavior, the image-based behavior may be calculated in a cycle differing from that the sensor-based behavior. For example, after the image-based behavior is calculated first, the display positions of the subject images 50b and 50c may be calculated only based on the sensor-based behavior for a predetermined period of time, and, after elapse of the predetermined period of time, the image-based behavior may be calculated once again. This configuration reduces an operation amount required for determining the display positions of the subject images 50b and 50c.

While in the above example, determination of the display positions of only the subject images 50b and 50c associated with the vehicle has been described, the detection results of the first sensor 19 and the second sensor 40 may also be used for determination of the display position of the subject image associated with the external space, such as the subject image 50a illustrated in FIG. 4, for example. To appropriately determine the display position of the subject image 50a in FIG. 4 associated with a store outside the vehicle, it is necessary to accurately detect the relative positional relationship between the display 14 and the store. However, extraction of sufficient feature points surrounding the store may fail depending on the content of the SLAM image 52, which may further lead to failure of accurate detection of the relative positional relationship between the display 14 and the store. In this case, the relative positional relationship between the display 14 and the store determined from the SLAM image 52 may be corrected based on the detection result of the first sensor 19. Specifically, the image controller 30 may determine the relative movement of the display 14 with respect to the store based on the absolute movement of the display 14 detected by the first sensor 19 and correct the relative positional relationship between the display 14 and the store determined from the SLAM image 52, based on the determined relative movement.

As described above, in the present embodiment, the second sensor 40 mounted in the mobile terminal 28 is used to detect the absolute movement of the vehicle. To accurately detect the absolute movement of the vehicle, it is necessary to fix the mobile terminal 28 so as to prevent movement of the mobile terminal 28 with respect to the vehicle. The present embodiment therefore includes the on-vehicle holder 44 that holds the mobile terminal 28. The on-vehicle holder 44 that holds the mobile terminal 28 will be described.

In this embodiment, the on-vehicle holder 44 holds the mobile terminal 28 such that three detection reference axes of the second sensor 40 are parallel to the longitudinal axis, vertical axis, and horizontal axis of the vehicle (hereinafter referred to as "vehicle reference axes"), respectively. Typically, the second sensor 40 is mounted in the mobile terminal 28 in such an attitude that the detection reference axes correspond to the widthwise axis, vertical axis, thickness-wise axis of the mobile terminal 28, respectively. Therefore, the on-vehicle holder 44 typically holds the mobile terminal 28 such that the widthwise axis, vertical axis, thickness-wise axis of the mobile terminal 28 are parallel to the vehicle reference axes, respectively.

Maintaining the detection reference axes of the second sensor 40 in parallel to the vehicle reference axes results in a reduction of volume of operation regarding the absolute movement of the vehicle. Specifically, vehicles often move frontward and backward, and the amount of movement in the widthwise direction and the vertical direction is small. Setting one of the detection reference axes of the second sensor 40 in parallel to the longitudinal axis of the vehicle reduces the movements to be input to the remaining two axes of the detection reference axes, thereby further reducing the volume of operation required to specify the absolute movement of the vehicle.

Figure 7:
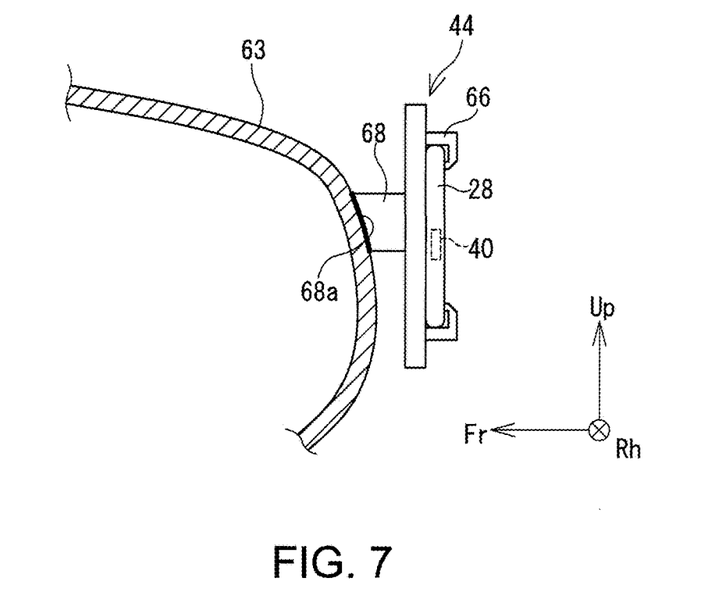
FIG. 7 illustrates an example on-vehicle holder.
Figure 8:
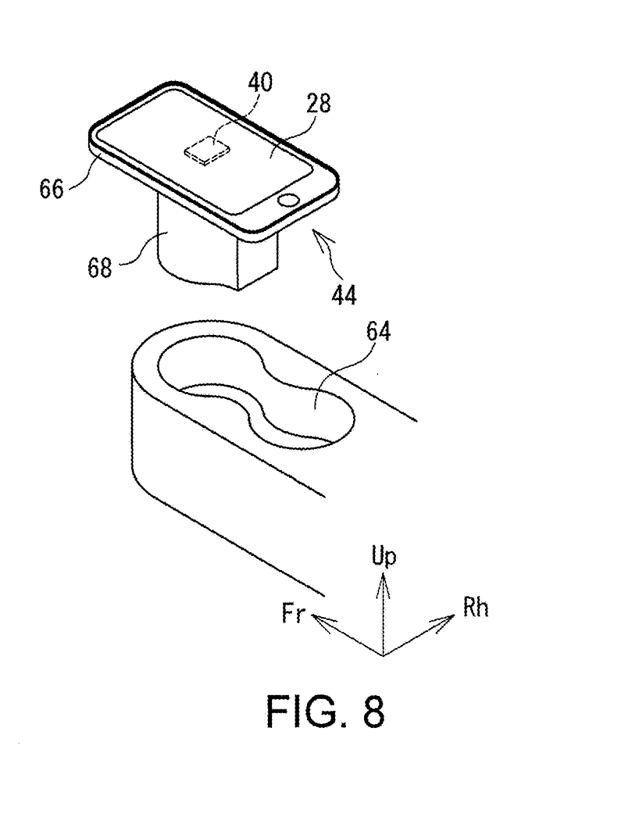
FIG. 8 illustrates another example on-vehicle holder.

The on-vehicle holder 44 is attached to a surface of a rigid body fixed to the vehicle body, such as an instrument panel, door trims, or console within the vehicle cabin. The on-vehicle holder 44 includes an attachment portion 68 attached to the vehicle and a holder portion 66 that holds the mobile terminal 28, as illustrated in FIGS. 7 and 8, for example. The attachment portion 68 is attached using a suction cup, adhesive tape, clip, screw, engagement, or the like. The holder portion 66 holds the mobile terminal 28 in a stationary state with respect to the attachment portion 68. The holder portion 66 may be a container that houses part or whole of the mobile terminal 28 so as not to move, or may be a clamp that holds the mobile terminal 28 with a spring or screw force.

The on-vehicle holder 44 may be configured to hold the mobile terminal 28 to thereby properly adjust the position and attitude of the mobile terminal 28. The on-vehicle holder 44, for example, may include the attachment portion 68 attached to the instrument panel 63 with an adhesive tape 68a and the holder portion 66 fixed to the attachment portion 68, as illustrated in FIG. 7. In the example illustrated in FIG. 7, the holder portion 66 has a clamp that clamps the mobile terminal 28 vertically with an urging force of a screw (not shown). By clamping and holding the mobile terminal 28 with the clamp, the position and attitude of the mobile terminal 28 with respect to the attachment portion 68 is fixed. The attachment portion 68 is previously positioned to a position and attitude such that the detection reference axes of the second sensor 40 are parallel to the vehicle reference axes and is then attached to the instrument panel 63. As it can be difficult for the user 100 to perform the positioning of the attachment portion 68, the positioning of the attachment portion 68 and the attaching operation may be performed by a dealer or repair facility.

In another embodiment, the attachment portion 68 of the on-vehicle holder 44 may be configured to be attached to a predetermine portion of the vehicle to allow automatic positioning. For example, as illustrated in FIG. 8, the on-vehicle holder 44 may include an attachment portion 68 to be fit in a non-circular recess (that is a beverage holder 64 in the example of FIG. 8) disposed in the vehicle cabin with no space between the attachment portion 68 and the recess, and a holder portion 66 in a shape of a container housing most of the mobile terminal 28 with no space between the container and the mobile terminal 28. This configuration automatically keeps the position and attitude of the holder portion 66 or further the mobile terminal 28 held in the holder with respect to the vehicle in a proper state, just by insertion of the attachment portion 68 into the non-circular recess or a beverage holder 64. While in the example illustrated in FIG. 8, the attachment portion 68 is inserted into the beverage holder 64, the attachment portion 68 that is perfectly fittable into a non-circular recess formed within the vehicle cabin without space may be inserted into other portions, such as an inner space of a console box or a door pocket formed in the door trim. This configuration enables the user 100 to position the on-vehicle holder 44 easily.

In spite of the modified configuration of the on-vehicle holder 44, the on-vehicle holder 44, which is a component independent of the vehicle, and the mobile terminal 28 are likely to oscillate slightly with respect to the vehicle. To eliminate effects of small oscillation of the mobile terminal 28 with respect to the vehicle, the image display system may be configured to exclude the detection value less than a predetermined reference value (that is, acceleration) of the detection values of the second sensor 40, from calculation of the absolute movement of the vehicle. For example, a low-pass filter or band-pass filter that removes a small acceleration change resulting from the small oscillation may be applied with respect to the detection values of the second sensor 40. This configuration effectively prevents the display position of the subject image 50 from oscillating due to the small oscillation of the mobile terminal 28. This further enables more appropriate AR display.

As is clear from the above description, according to the present embodiment, the first sensor 19 mounted in the wearable device 12 and the second sensor 40 mounted in the mobile terminal 28 individually detect the absolute movement of the display 14 and the absolute movement of the vehicle, respectively. This configuration enables increasing the accuracy of localization of the display 14 with respect to the vehicle, thereby enabling more appropriate AR display. The configurations described above are only examples and may be modified as appropriate. For example, while in the above description, the mobile body the user 100 boards is a vehicle, the mobile body the user 100 boards may be a train, a motor bike, an airplane, or a scooter, for example.

REFERENCE SIGNS LIST 10 image display system, 12 wearable device, 14 display, 16 SLAM camera, 18 pupil position sensor, 19 first sensor, 20 device controller, 22 display area, 24 rim, 26 temple, 28 mobile terminal, 30 image controller, 32 processor, 34 memory, 35 communication I/F, 38 user I/F, 40 second sensor, 44 on-vehicle holder, 50 subject image, 52 SLAM image, 56 imaging area, 60 steering wheel, 63 instrument panel, 64 beverage holder, 66 holder portion, 68 attachment portion, 68a adhesive tape, 100 user.

The invention claimed is:

1. An image display system comprising:
a wearable device configured to be attached to the head of a user that is an occupant of a mobile body, the wearable device comprising
a display configured to display an image on a field of vision of the user,
a first sensor configured to detect an absolute movement of the display with respect to an external stationary object, and
a simultaneous localization and mapping (SLAM) camera configured to capture an image of surroundings of the wearable device as a SLAM image;
a mobile terminal comprising a second sensor configure to detect an absolute movement of the mobile body; and
an image controller comprising a computer installed in at least one of the wearable device or the mobile terminal, the image controller configured to enable the display to display a subject image representing an object in such a manner that the object that is represented by the subject image is actually present, wherein
the image controller is configured to
estimate, as an image-based behavior, the absolute movement of the display based on the SLAM image captured by the SLAM camera;
estimate, as a sensor-based behavior, a relative movement of the display with respect to the mobile body based on a difference between the absolute movement of the display detected by the first sensor and the absolute movement of the mobile body detected by the second sensor;
correct the image-based behavior based on the sensor-based behavior, to estimate a corrected relative movement of the display with respect to the mobile body;
determine a display position of the subject image associated with the mobile body on the display based on the corrected relative movement; and
determine a display position of the subject image associated with an external space outside the mobile body on the display based at least on the image-based behavior.

2. The image display system according to claim 1, wherein
each of the first sensor and the second sensor includes at least one of an accelerometer or a gyroscope sensor.

3. The image display system according to claim 1, wherein
the second sensor is configured to detect the absolute movement with reference to mutually orthogonal three detection reference axes, and
the image display system further comprises an on-vehicle holder fixed to the mobile body, the on-vehicle holder configured to hold the mobile terminal such that the detection reference axes of the second sensor are parallel to a longitudinal axis, a vertical axis, and a lateral axis of the mobile body, respectively.

4. The image display system according to claim 3, further comprising a non-circular recess disposed inside the mobile body,
wherein the on-vehicle holder includes:
an attachment portion having a shape that fits in the non-circular recess with no space between the attachment portion and the recess; and
a holder portion configured to hold the mobile terminal.

5. The image display system according to claim 1, wherein
the mobile terminal is configured to be fixed to a surface of a rigid body, within a vehicle cabin, secured to the mobile body.

6. The image display system according to claim 1, wherein the image controller is configured to exclude a detection value of the second sensor which is equal to or smaller than a predetermined reference value from calculation of the display position.

\* \* \* \* \*